(12) United States Patent
Hosomi et al.

(10) Patent No.: US 6,352,318 B1
(45) Date of Patent: Mar. 5, 2002

(54) WHEEL CONTROL STATE DISPLAY APPARATUS

(75) Inventors: Kazushi Hosomi, Susono; Shinsuke Yamamoto, Numazu; Akira Nagae, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/572,851

(22) Filed: May 18, 2000

(30) Foreign Application Priority Data

Jun. 3, 1989 (JP) .............................. 11-156566

(51) Int. Cl.$^7$ ................................................ B60T 8/24
(52) U.S. Cl. ...................................... 303/139; 340/453
(58) Field of Search ............................... 303/139, 163, 303/167, 113.2; 340/453, 467, 479

(56) References Cited

U.S. PATENT DOCUMENTS 3,668,629 A * 6/1972 Pawl ........................ 340/453
4,702,336 A * 10/1987 Seibert et al. ............... 180/197
5,139,115 A * 8/1992 Browne et al. ......... 188/1.11 L
5,519,617 A * 5/1996 Hughes et al. ........ 303/113.2 X

FOREIGN PATENT DOCUMENTS

| DE | 195 28 408 A1 | | 2/1995 |
| JP | 3-182842 A | * | 8/1991 |
| JP | 9-104340 | | 4/1997 |
| JP | B2-2773327 | | 4/1998 |

* cited by examiner

*Primary Examiner*—Pam Rodriguez
(74) *Attorney, Agent, or Firm*—Oliff & Berridge, PLC

(57) ABSTRACT

A wheel control state display apparatus of the present invention has a vehicle state detector for detecting a state of a vehicle, a traction-braking force controller for adjusting braking force or traction at a plurality of wheels mounted on the vehicle, based on the result of detection of the vehicle state detector, and a control state display for displaying a wheel under adjustment of the braking force or the traction by the traction-braking force controller. The apparatus according to the present invention can present the conditions of the vehicle to the driver in more detail by displaying which wheel is under the adjustment of the traction-braking force.

6 Claims, 3 Drawing Sheets

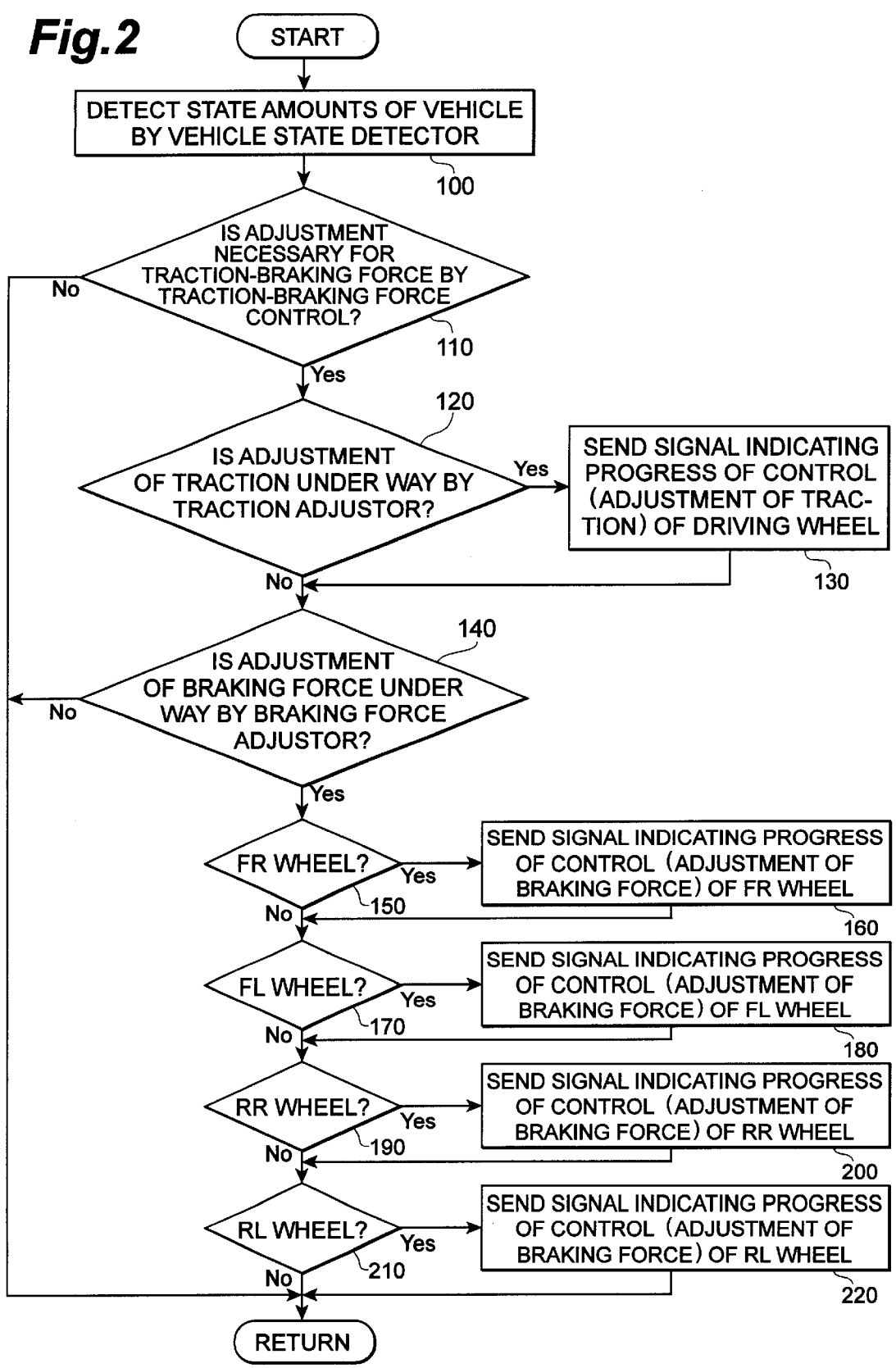

WHEEL CONTROL STATE DISPLAY APPARATUS

BACKGROUND OF THE INVENTION

1. Field of the Invention

The present invention relates to a wheel control state display apparatus for displaying control states of wheels.

2. Related Background Art

In recent years control of travel of vehicles has been becoming highly advanced and there are examples wherein the braking force and/or traction (which will also be referred to together as "traction-braking force") at wheels is automatically adjusted by various systems mounted on vehicles. For example, such various systems include a traction control system intended to efficiently yield the traction while suppressing acceleration slip of the wheels, an ABS (anti-lock brake system) intended to efficiently obtain the braking force while suppressing deceleration slip of the wheels, a stability control system intended to stabilize vehicle motion, a brake assist system for compensating for shortage of braking force upon panic braking, and so on.

When these traction-braking force controls were active, a beeper or an indicator in a meter informed the driver of the active status of the traction-braking force controls (though there were also such cases that the driver was not informed of the control of the ABS etc.). Japanese Patent Application Laid-Open No. 3-182862 also describes a unit designed to detect the slip of each wheel and display which wheel is slipping.

SUMMARY OF THE INVENTION

In the conventional controls wherein the traction-braking force was adjusted automatically, the driver was not informed of which wheel was under control of the traction-braking force by the various control systems. As for the unit capable of displaying which wheel is slipping, it was able to display slipping states of the wheels, but it failed to indicate control activity of the traction-braking force. However, should the driver know which wheel is under control of the traction-braking force by the various control systems, the driver would be able to recognize the circumstances of the vehicle in more detail and drive the vehicle with reflecting the information in certain cases.

An object of the present invention is, therefore, to provide a wheel control state display apparatus that can display which wheel is under control of the traction-braking force, so as to present the state of the vehicle to the driver in detail.

A wheel control state display apparatus of the present invention comprises vehicle state detecting means for detecting a state of a vehicle; traction-braking force control means for adjusting braking force or traction at a plurality of wheels mounted on the vehicle, based on a result of detection of the vehicle state detecting means; and control state display means for displaying a wheel under adjustment of the braking force or the traction by the traction-braking force control means.

In the wheel control state display apparatus of the present invention, the control state display means displays the wheel under the adjustment of the traction-braking force during periods of the adjustment of the traction-braking force by the traction-braking force control means, based on the result of detection of the vehicle state detecting means, whereby the driver is allowed to recognize the state of the vehicle in detail.

In a preferred embodiment, the control state display means comprises display areas for the respective wheels located in a layout similar to that of the wheels in the vehicle. This structure clearly shows which wheel is under the adjustment of the traction-braking force executed by the traction-braking force control means, whereby the driver is allowed to recognize the indication readily even during driving.

In a further preferred embodiment, the traction-braking force control means comprises braking force adjusting means for adjusting the braking force at each of the wheels by urging a friction material against the wheel or a rotary part to which the wheel is coupled and the control state display means displays a wheel under adjustment of the braking force by the braking force adjusting means. This structure permits the driver to recognize that the "braking force" is adjusted by the braking force adjusting means, as well as the simple recognition of the adjustment of traction-braking force, whereby the driver is allowed to recognize the state of the vehicle in more detail.

In another preferred embodiment, similar to the above, the traction-braking force control means comprises traction adjusting means for adjusting the traction at the wheels and the control state display means displays a wheel under adjustment of the traction by the traction adjusting means. This structure permits the driver to recognize that the "traction" is adjusted by the traction adjusting means, as well as the simple recognition of the adjustment of traction-braking force, whereby the driver is allowed to recognize the state of the vehicle in more detail.

In another preferred embodiment, the traction-braking force control means comprises braking force adjusting means for adjusting the braking force at each of the wheels by urging a friction material against the wheel or a rotary part to which the wheel is coupled, and traction adjusting means for adjusting the traction at the wheels, and the control state display means displays different display patterns in the display areas for the respective wheels between in a situation in which only the "braking force" is adjusted at the wheels by the braking force adjusting means and in a situation in which only the "traction" is adjusted at the wheels by the traction adjusting means.

This structure allows the driver to recognize that the adjustment of the traction-braking force is effected either by the braking force adjusting means or by the traction adjusting means while discriminating one from another, as well as the simple recognition of the adjustment of the traction-braking force. When the control state display means displays the different display patterns, the driver can accurately recognize which is under way between the adjustment of the braking force by the braking force adjusting means and the adjustment of the traction by the traction adjusting means, even during driving.

In a further preferred embodiment, the vehicle state detecting means is slip rate detecting means for detecting slip rates of the wheels, and the traction-braking force control means is traction control means for adjusting the braking force or the traction at the wheels in order to restrain a slip at the wheels, based on a result of detection of the slip rate detecting means.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a flowchart of a display control carried out by the wheel control state display apparatus illustrated in FIG. 1A.

DESCRIPTION OF THE PREFERRED EMBODIMENTS

Figure 1A:
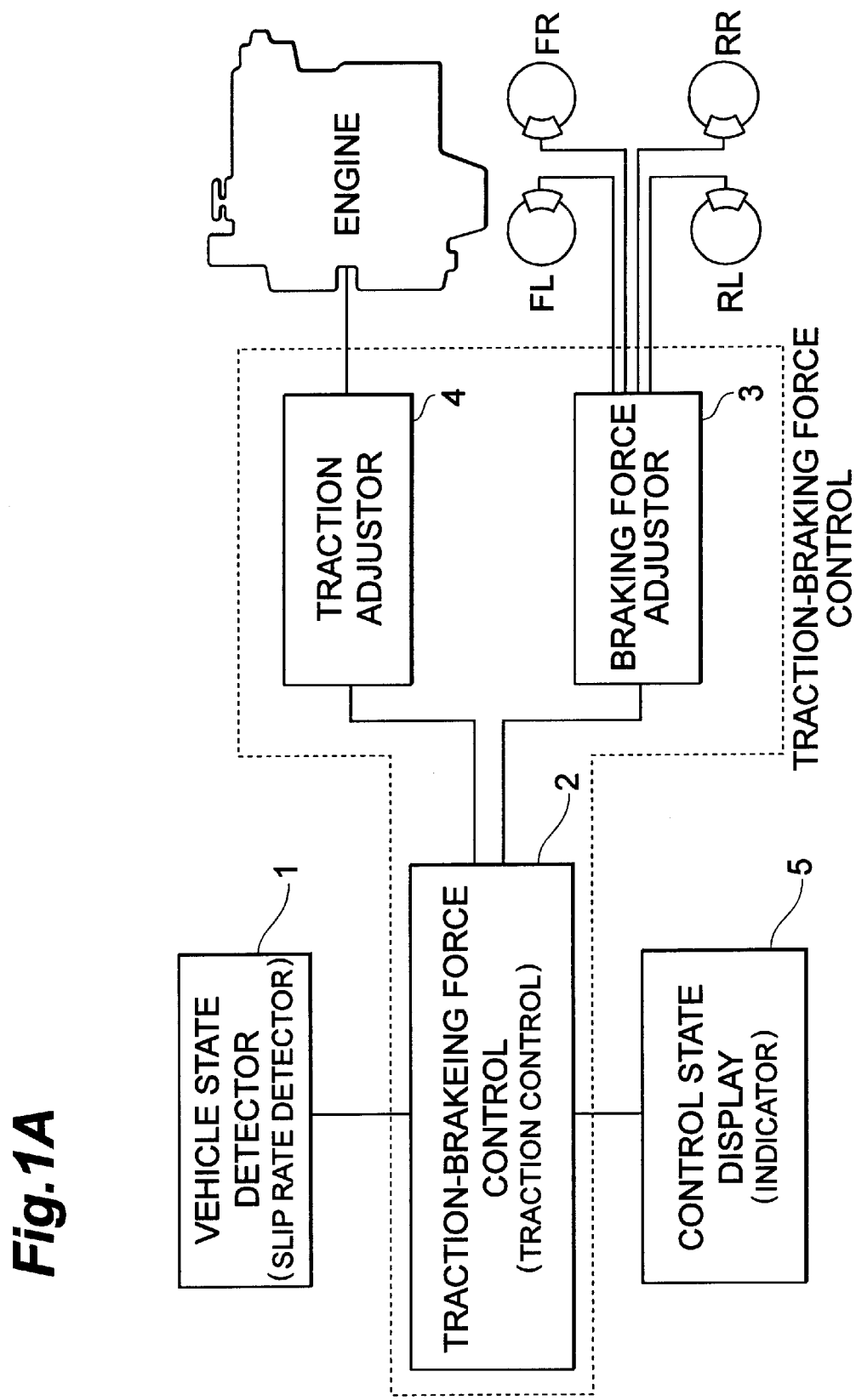
FIG. 1A is a structural diagram to show the structure of an embodiment of the wheel control state display apparatus of the present invention.

An embodiment will be described as to the wheel control state display apparatus of the present invention. In the following embodiment the apparatus will be described, particularly, in such structure that the vehicle state detecting means is the slip rate detecting means and the traction-braking force control means is the so-called traction control means. This traction control means adjusts the braking force or the traction so as to restrain the acceleration slip of the wheels and a state of the control is displayed by the control state display means. The structure of the wheel control state display apparatus of the present embodiment is illustrated in FIG. 1A.

The slip rate detecting means (vehicle state detecting means) 1 in the traction control system is wheel speed sensors for detecting the wheel speed of each wheel. The slip rate detecting means 1 is connected to the traction control means (traction-braking force control means) 2. The traction control means 2 is, specifically, a skid control computer which generally governs the whole braking control. The traction control means 2 computes a slip rate of each wheel from the wheel speed of the wheel detected by the slip rate detecting means 1. Then the traction control means 2 makes a judgment about which wheel needs the control of the traction-braking force and then sends a command for execution of control to braking force adjusting means 3 or to traction adjusting means 4 (these means also functioning as part of the traction-braking force control means). In this example, increase in the slip at the wheels due to the acceleration slip is restrained, mainly, by increasing the braking force of the wheels and/or by decreasing the traction.

The braking force adjusting means 3 performs braking by a so-called hydraulic brake system. The braking force adjusting means 3 is comprised of brake tubes filled with a fluid such as brake oil or the like, a brake actuator (pumps, an accumulator, valves, etc.), friction materials (brake pads or brake shoes), rotary parts (brake disks or brake drums), and so on.

The braking force adjusting means 3 adjusts the braking force at the wheels by urging the brake linings (friction material) against the rotary parts rotating together with the wheels, by use of the brake actuator. Since the brake tubes are set for the respective wheels and the valve and other elements for adjusting the hydraulic pressure are also placed on each tube, the braking force adjusting means 3 can adjust the braking force of each wheel independently. The adjustment of braking force is carried out by appropriately increasing, holding, or decreasing the hydraulic pressure in accordance with the state of the vehicle.

On the other hand, the traction adjusting means 4 adjusts the traction at the wheels by reducing power output of a vehicle driving source (which is an engine in the present embodiment or which can be a driving motor or the like in the case of electric cars). The control of the engine power output is implemented, for example, by throttle control to limit the intake air volume, ignition timing control to change ignition timing, fuel injection amount control to limit fuel supply, and so on. In other words, the traction adjusting means 4 is constructed of the entire engine system. Since the traction adjusting means 4 adjusts the traction by reducing the engine power output by the various controls described above, the adjustment of traction by the traction adjusting means 4 is available only for the driving wheels.

Figure 1B:
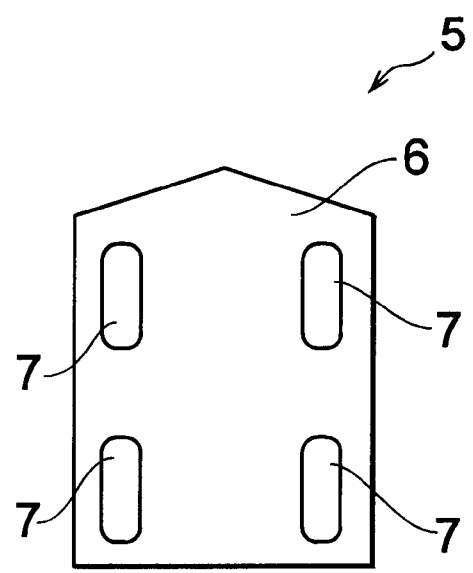
FIG. 1B is an explanatory diagram to show a control state display (indicator) in an embodiment of the wheel control state display apparatus of the present invention.

The control state display means 5 is also connected to the traction control means 2. In the present embodiment an indicator installed in the instrument panel functions as the control state display means 5. The indicator 5 is composed, as illustrated in FIG. 1B, of an almost rectangular vehicle contour section 6 similar to a plan view of the vehicle, and four lamps (displays) 7 located at respective positions corresponding to the wheels in the vehicle contour section 6.

Next described based on the flowchart illustrated in FIG. 2 is how the control states of the wheels are displayed by the wheel control state display apparatus having the above structure. The flowchart illustrated in FIG. 2 is stored in the form of a program in a ROM built in the skid control computer and is carried out repeatedly every predetermined time.

First, vehicle state amounts (wheel speeds) are detected by the vehicle state detecting means (which is the slip rate detecting means herein, specifically, the wheel speed sensors) 1 (step 100). Based on the vehicle state amounts detected, the traction-braking force control means (the traction control means herein; specifically, the skid control computer) 2 determines whether the adjustment of traction-braking force is necessary (step 110). When the adjustment of traction-braking force is necessary, the traction-braking force control means 2 also simultaneously determines which wheel needs the adjustment of traction-braking force and what is a suitable proportion of the adjustment of braking force by the braking force adjusting means 3 to the adjustment of traction by the traction adjusting means 4. Then the control of traction-braking force will be executed.

When there is no need for the adjustment of traction-braking force, the control unit leaves the flowchart illustrated in FIG. 2 without carrying out the subsequent steps. When the adjustment of traction-braking force is necessary, it is determined whether the traction adjusting means 4 is now carrying out the adjustment of traction (step 120). When the adjustment of traction is under way by the traction adjusting means 4, the control unit sends a command signal to light up or blink the display (lamp) 7 corresponding to the driving wheel under the adjustment of traction, to the control state display means (indicator) 5 (step 130). In the present embodiment the lamp 7 corresponding to the wheel under the adjustment of traction is "lit up in blue."

After step 120 is negated or after step 130 has been completed, it is then determined whether the braking force adjusting means 3 is now carrying out the adjustment of braking force (step 140). When the adjustment of braking force is not under way by the braking force adjusting means 3, the control unit leaves the flowchart illustrated in FIG. 2, without carrying out the subsequent steps. When the braking force adjusting means 3 is carrying out the adjustment of braking force, in order to discriminate the wheel under the adjustment of braking force, it is first determined whether the front right wheel is under the adjustment of braking force (step 150).

When the front right wheel is under the adjustment of braking force, the control unit sends a command signal to light up or blink the lamp 7 corresponding to the front right wheel, to the indicator 5 (step 160). At this time the lamp 7 corresponding to the wheel under the adjustment of braking force is "blinked in green." If the signal indicating the adjustment of traction as to the front right wheel has already been sent at step 130, the lamp 7 corresponding to the front right wheel is "blinked in blue" to indicate execution of both the adjustment of braking force and the adjustment of traction.

After step 150 is negated or after step 160 has been completed, it is then determined whether the front left wheel is under the adjustment of braking force (step 170). When the front left wheel is under the adjustment of braking force, the control unit sends a command signal to light up or blink the lamp 7 corresponding to the front left wheel, to the indicator 7, similarly (step 180), and the lamp 7 corresponding to the front left wheel is "blinked in green." If both the adjustment of braking force and the adjustment of traction are under way, the lamp is "blinked in blue."

After step 170 is negated or after step 180 has been completed, similar operations are carried out for the rear right wheel (steps 190, 200) and similar operations are also carried out for the rear left wheel (steps 210, 220). After step 210 is negated or after step 220 has been completed, the control unit leaves the flowchart illustrated in FIG. 2.

In the vehicle control state display apparatus described above, when the adjustment of the traction-braking force is under way by the traction-braking force control means 2, 3, 4, the control state display means 5 displays the wheel under the adjustment of the traction-braking force; therefore, the driver can recognize the state of the vehicle in detail. Depending upon the driving conditions of the vehicle, the driver can drive the vehicle, based on the information indicated by the control state display means 5. For example, in the case of off-road vehicles running off-road, when the control by the traction control system is under way in the slipping condition of the wheels due to the acceleration slip, there are some cases wherein the driver can drive better when informed of which wheel is under the traction control.

Since the indicator 5 described above has the lamps 7 for the respective wheels representing the locations of the wheels in the vehicle, the driver can readily recognize which wheel is under the adjustment of the traction-braking force, even during driving. Further, the display patterns of the lamps 7 are different among the situation wherein either of the corresponding wheels is under the adjustment of only the braking force by the braking force adjusting means 3, the situation wherein it is under the adjustment of only the traction by the traction adjusting means 4, and the situation wherein it is under the adjustment of both the braking force and traction by the two means; therefore, the driver can capture the control states of the wheels in more detail.

It is noted that the wheel control state display apparatus of the present invention is not limited to the embodiment described above. For example, in the above embodiment the traction-braking force control means was the so-called traction control means and the indicator 5 indicated the wheel under the adjustment of the traction-braking force during the traction control by the traction control system. However, the apparatus may be constructed in such structure that the indicator 5 also indicates the wheel under the adjustment of traction-braking force during any control by the ABS, the stability control system, the brake assist system, or the like, other than the so-called traction control system.

In the case of the ABS, the structure of the wheel control state display apparatus is similar to that in the case of the traction control system described above. The adjustment of the traction-braking force during the control by the ABS is effected, mainly, by reducing the braking force, in order to suppress wheel lockup due to the deceleration slip. (During the control, the braking force is suitably increased, held, or decreased as occasion arises.)

In the case of the stability control system, a yaw rate sensor for detecting a yaw rate of the vehicle, an acceleration sensor for detecting the deceleration of the vehicle, a steering-wheel angle sensor for detecting a steering angle of the steering wheel, etc. also function as the vehicle state detecting means, in addition to the wheel speed sensors described above. The adjustment of the traction-braking force during the control by the stability control system is implemented, mainly, by increasing the braking force and/or decreasing the traction, in order to stabilize the motion of the vehicle.

In the case of the brake assist system, for example, a master-cylinder pressure sensor for detecting stepping-on speed or stroke of the brake pedal also functions as the vehicle state detecting means, in addition to the aforementioned wheel speed sensors. The adjustment of the traction-braking force during the control by the brake assist system is effected, mainly, by increasing the braking force, in order to supplement the braking force at the wheels, which is likely to be short in an emergency.

Since the skid control computer described above controls the control states of the wheels in either of the controls by the traction control system, the ABS, the stability control system, and the brake assist system, it functions as the traction-braking force control means in either of the controls. In either of the controls stated above, the braking force adjusting means 3 and the traction adjusting means 4 adjust the traction-braking force at the wheels while acting as the traction-braking force control means.

In the embodiment described above the control state display means 5 was the indicator representing the layout of the wheels in the vehicle. This structure is preferable, because the control states are easy to recognize. However, the control states may also be displayed in the form of "front right(or FR)," "front and rear right(or FR RR)," etc. in a character display section. The display section may also be arranged simply to present different display patterns between the adjustment of only the braking force and the adjustment of only the traction. It is, however, preferable that the display pattern of the display section for both the adjustment of the braking force and the adjustment of the traction be made different from those for the adjustment of only the braking force and for the adjustment of only the traction, as in the case of the lamp 7 in the present embodiment. This allows the driver to recognize the control states of the wheels in more detail.

The wheel control state display apparatus of the present invention comprises the vehicle state detecting means for detecting the state of the vehicle, the traction-braking force control means for adjusting the braking force or the traction at a plurality of wheels mounted on the vehicle, and the control state display means for displaying the wheel under the adjustment of the braking force or the traction carried out by the traction-braking force control means. In this structure, the control state display means displays the wheel under the adjustment of the traction-braking force during the period of the adjustment of the traction-braking force by the traction-braking force control means, based on the detection result of the vehicle state detecting means, whereby the driver is allowed to recognize the state of the vehicle in detail.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wheel control state display apparatus, comprising:
   vehicle state detecting means for detecting a state of a vehicle;
   traction-braking force control means for adjusting braking force or traction at a plurality of wheels mounted on the vehicle, based on a result of detection of said vehicle state detecting means; and
   control state display means for displaying which wheel is under adjustment of the braking force or the traction by said traction-braking force control means.

2. The wheel control state display apparatus according to claim 1, wherein said control state display means comprises display areas for the respective wheels located in a layout similar to that of said wheels in said vehicle.

3. The wheel control state display apparatus according to claim 2, wherein said traction-braking force control means comprises braking force adjusting means for adjusting the braking force at each of said wheels by urging a friction material against said wheel or a rotary part to which said wheel is coupled, and traction adjusting means for adjusting the traction at said wheels, and
   wherein said control state display means displays different display patterns in said display areas for the respective wheels between in a situation in which only the braking force is adjusted at said wheels by said braking force adjusting means and in a situation in which only the traction is adjusted at said wheels by said traction adjusting means.

4. The wheel control state display apparatus according to claim 3, wherein said vehicle state detecting means is slip rate detecting means for detecting slip rates of said wheels, and
   wherein said traction-braking force control means is traction control means for adjusting the braking force or the traction at said wheels in order to restrain a slip at said wheels, based on a result of detection of said slip rate detecting means.

5. The wheel control state display apparatus according to claim 1, wherein said traction-braking force control means comprises braking force adjusting means for adjusting the braking force at each of said wheels by urging a friction material against said wheel or a rotary part to which said wheel is coupled and wherein said control state display means displays a wheel under adjustment of the braking force by said braking force adjusting means.

6. The wheel control state display apparatus according to claim 1, wherein said traction-braking force control means comprises traction adjusting means for adjusting the traction at said wheels and wherein said control state display means displays a wheel under adjustment of the traction by said traction adjusting means.

* * * * *

UNITED STATES PATENT AND TRADEMARK OFFICE
CERTIFICATE OF CORRECTION

PATENT NO.    : 6,352,318 B1
DATED         : March 5, 2002
INVENTOR(S)   : Kazushi Hosomi et al.

It is certified that error appears in the above-identified patent and that said Letters Patent is hereby corrected as shown below:

<u>Title page,</u>
Item [30], should read:

-- [30]    Foreign Application Priority Data
   Jun. 3, 1999 (JP)................. 11-156566 --

Signed and Sealed this

Third Day of September, 2002

Attest:

Attesting Officer

JAMES E. ROGAN
*Director of the United States Patent and Trademark Office*